United States Patent [19]

Adam et al.

[11] 4,381,468
[45] Apr. 26, 1983

[54] COMMUTATOR MOTOR BRUSH MOUNTING ARRANGEMENT

[75] Inventors: Peter Adam, Höchberg; Ewald Wehner, Würzberg, both of Fed. Rep. of Germany

[73] Assignee: Siemens Aktiengesellschaft, Berlin and Munich, Fed. Rep. of Germany

[21] Appl. No.: 274,380

[22] Filed: Jun. 17, 1981

[30] Foreign Application Priority Data

Jun. 25, 1980 [DE] Fed. Rep. of Germany ....... 3023803

[51] Int. Cl.³ .......................................... H02K 13/00
[52] U.S. Cl. ................................. 310/239; 310/241; 310/246
[58] Field of Search ........................... 310/239–247, 310/91, 133, 219–231, 248, 249, 128, 136, 89

[56] References Cited

U.S. PATENT DOCUMENTS

| | | | |
|---|---|---|---|
| 2,760,094 | 8/1956 | Edmundson | 310/244 |
| 3,851,197 | 11/1974 | Watanabe | 310/244 |
| 4,342,934 | 8/1982 | Van Wijhe et al. | 310/239 |

FOREIGN PATENT DOCUMENTS 2813956  4/1979  Fed. Rep. of Germany ...... 310/241

*Primary Examiner*—R. Skudy
*Attorney, Agent, or Firm*—Kenyon & Kenyon

[57] ABSTRACT

A commutator motor brush mounting arrangement is arranged in an axial opening of an electric motor housing. The arrangement is provided with mounting bars which protrude axially from a support plate, the mounting bars being arranged at the interior of the motor housing. Hammer-shaped brush holders which are formed with half-open bearing shells are rotatably engaged with the mounting bars. Axial displacement of the brush holders in a first direction is prevented by the front plate, and in a second direction by an end plate. The end plate is provided with elastic openings for engaging posts arranged on the mounting bars in a self-locking manner. The support plate and the end plate are provided with respective complementary guide portions in the form of support ribs and corresponding depressions. Such guide portions rotatably secure the hammer-shaped brush holders to the mounting bars, so as to prevent canting and binding of the brush holders within the motor housing.

8 Claims, 5 Drawing Figures

4,381,468

COMMUTATOR MOTOR BRUSH MOUNTING ARRANGEMENT

BACKGROUND OF THE INVENTION

This invention relates generally to commutator motor brush mounting assemblies, and more particularly, to a brush mounting arrangement which is secured in an axial opening of the motor housing, the brush mounting arrangement being formed of a plurality of plastic mounting plates, one such mounting plate having an integrally formed connector housing.

One known commutator motor of the type wherein brushes are arranged in an assembly which is secured in an axial opening of the motor housing is described in German Reference DE-AS No. 28 13 956. The commutator motor described therein is provided with hammer-shaped brush holders which depend from mounting bars, and are axially secured by only a one-sided contact against a front plate, and by a force created by springs which are attached at a free end of the hammer-shaped brush holders.

It is an object of this invention to provide an improved commutator motor by providing a brush mounting arrangement wherein hammer-shaped brush holders are affixed at mounting bars so as to prevent axial and radial displacement, thereby avoiding jamming of the brushes within the motor housing.

It is a further object of this invention to provide an improved brush mounting arrangement for a commutator motor wherein the brush mounting assembly is easily and simply removed and installed.

SUMMARY OF THE INVENTION

The foregoing and other objects are achieved by this invention which provides a commutator motor brush mounting arrangement wherein hammer-shaped brush holders are secured against axial and radial displacement by an end plate which is mechanically coupled to a brush support plate. The end plate is arranged near mounting bars which support the brush holders, after the brush holders are arranged on the mounting bars. In one embodiment, the end plate is provided with rib portions which correspond to depressions on the front plate so as to secure the brush holders from being displaced radially.

In one embodiment of the invention, the support plate, which is provided with appropriately formed grooves to engage the axial opening of the motor housing, assures a secure radial and axial fixation of the rotatable hammer-shape brush holders to the mounting bars, the mounting bars being preassembled with the support plate. Such fixation ensures reliable operation over long periods, notwithstanding the presence of mechanical shocks, the fatiguing of the brush pressure spring, or the wear of the carbon brushes.

The guide shell which is formed by the combination of the support plate and the end plate may be easily manufactured of a plastic material using injection moulding techniques. In one embodiment, the guide ribs are designed so as to protrude axially from a selectable one of the support and end plates, the other plate having a depression having a configuration which corresponds to the guide rib, illustratively of a circular shape. Such a guide shell may be formed using dies, or the guide shell may be assembled by affixing the end plate onto the support plate, with the brush holders interposed therebetween.

The end plate is provided with integrally formed elastic openings which are engageable in a self-locking manner to corresponding posts which are mechanically affixed to the support plate. Such posts are integrally formed with the support plate and protrude axially therefrom so as to be engageable at their outward most ends with the elastic openings in the end plate. In addition, the posts are provided with mounting bars which are each provided with an edge for engaging a respective brush holder.

BRIEF DESCRIPTION OF THE DRAWINGS

Comprehension of the invention is facilitated by reading the following detailed description in conjunction with the annexed drawings, in which.

DETAILED DESCRIPTION

Figure 1:
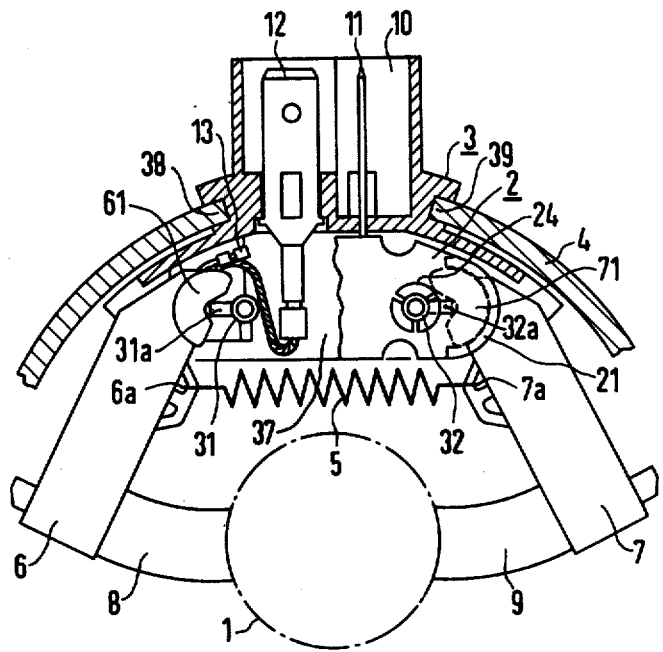
FIG. 1 is a cross-sectional representation of a commutator motor showing the cross section of the inventive brush mounting arrangement.

FIG. 1 shows a partial cross section of a motor housing 4 of an encapsulated commutator motor. A support plate 3, which is shown in cross section, is engaged in an axial longitudinal slot (not specifically identified) in motor housing 4 which, in this axially transverse, cross-sectional depiction, is shown to have a pair of axial edges 38 and 39. Means are provided (not shown) for securing brush support plate 3 to the motor housing to prevent its sliding out of the axial longitudinal slot. Support plate 3 extends circumferentially beyond the axial longitudinal slot, both within and outside of the motor housing, so as to effectively seal the axial longitudinal slot. Such sealing at edges 38 and 39 of the axial longitudinal slot in the motor housing is achieved by providing corresponding mating grooves in the support plate, as shown. German Reference DE-AS No. 28 13 956, described hereinabove, teaches one known arrangement for securing the support plate in the axial longitudinal slot of motor housing 4, at a end face of the motor.

Brush support plate 3 is provided with an integrally formed, substantially radial front plate 37, on which are formed axial mounting bars 31 and 32, each having a respective parallel edge 31a and 32a formed thereon. A respective one of a pair of hammer-shape brush holders 6 and 7 is in contact with the respectively associated one of edges 31a and 32a. Hammer-shaped brush holders 6 and 7 hang from respectively associated bearing shells 61 and 71, which are integrally formed therewith. A brush pressure spring 5, of the tension type, is stretched between brush holders 6 and 7, and coupled thereto by respective fastening eyes 6a and 7a. Spring 5 urges the hammer-shaped brush holders 6 and 7 against mounting bars 31 and 32, thereby permitting the brush holders to be held within the support and end plates as the overall assembly is inserted into the axial longitudinal opening of housing 4. Carbon brushes 8 and 9 are clamped in pockets at the outermost ends of respective ones of brush holders 6 and 7. During insertion of the assembly into the motor, the free ends of the brush holders which are provided with the carbon brushes are spread apart, against the pull of spring 5, to permit the carbon brushes to be placed on a commutator 1, as shown.

Figure 4:
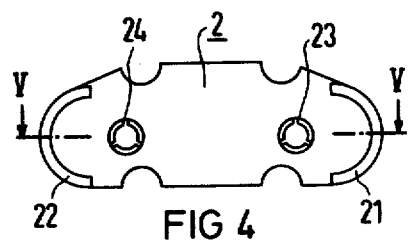
FIG. 4 is a plan view of the end plate of FIG. 1, showing the side of the end plate which faces the support plate.
Figure 5:
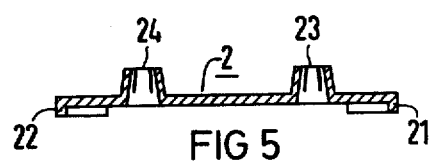
FIG. 5 is a cross-sectional view of the end plate of FIG. 4, taken along section plane V—V.

As indicated hereinabove, brush holders 6 and 7 are prevented from being displaced in the axial direction of the motor, by being interposed between front plate 37 and end plate 2, which is shown in detail in FIGS. 4 and 5. End plate 2 is affixed to support plate 3 after hammer-shape brush holders 6 and 7 are arranged on edges 31a and 32a, by elastic openings 23 and 24 which are integrally formed with the end plate. Elastic openings 23 and 24 engage the outward most ends of mounting bars 31 and 32 and corresponding posts 35 and 36. The end plate is placed over the front plate, shown in detail in FIG. 2, so that post 35 protrudes through elastic opening 23, and post 36 protrudes through elastic opening 24, the end plate being held at a predetermined distance from front plate 37 by mounting bars 31 and 32. The engagement of posts 35 and 36 with elastic openings 23 and 24 is self-locking.

Figure 3:
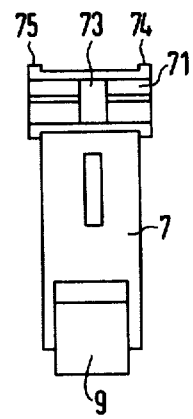
FIG. 3 is a plan view of the commutator side of a hammer-shaped brush holder.

In addition to preventing brush holders 6 and 7 from being displaced along the axial direction of the motor, front plate 37 and end plate 2 further serve to secure the brush holders from becoming radially displaced, or tilted on their edge supports. Ribs 21 and 22, which are directed axially toward front plate 37, are formed on end plate 2, and axially disposed depressions 33 and 34 are formed into front plate 37. As shown, ribs 21 and 22, and depressions 33 and 34, respectively, are open in the inward direction toward the edges 31a and 32a, and extend beyond the outside contour of bearing shells 61 and 71. In this manner, the ribs and depressions radially secure the hammer-shaped brush holders so as to be rotatable about edges 31a and 32a. As shown in FIG. 3, bearing shell 71 is provided with an axial end 75 which engages depression 34, and a further axial end 74 which is retained within the inner contour of rib 22. A central portion 73 is provided in bearing shell 71 to insure that a good seating engagement is provided between the bearing shell at central portion 73 and edge 32a. Of course, brush holder 6 is constructed so as to be similar to brush holder 7, shown in FIG. 3, but in a mirror-image configuration. The brush holders may be identical to one another in symmetrical embodiments of the invention.

Figure 2:
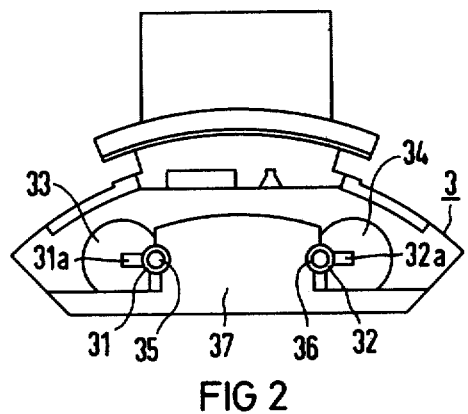
FIG. 2 is a plan view of the support plate shown in FIG. 1.

FIGS. 1 and 2 show a connector housing 10 which is formed integrally with brush support plate 3, and contains a pair of plug contacts 11 and 12 therein. Plug contacts 11 and 12 are insulated from motor housing 4. The plug contacts are provided with inner portions which extend into the interior of the motor, and are electrically coupled to respective ones of carbon brushes 8 and 9. In this embodiment, the brushes are coupled to their respective plug contacts by means of respective interference supression chokes (not shown). Such chokes are affixed to the upper rear portion of hammer-shaped brush holders 6 and 7. Alternatively, connector housing 10 may be configured to extend axially outward from an end opening through the motor housing, instead of the radial protrusion described herein.

Although the inventive concept has been disclosed in terms of specific embodiments and applications, other embodiments and applications, in light of this teaching, would be obvious to persons skilled in the pertinent art. Accordingly, it is to be understood that the drawings and descriptions in this disclosure are proffered to facilitate comprehension of the principles of the invention, and should not be construed to limit the scope thereof.

What is claimed is:

1. A commutator motor brush mounting arrangement, the arrangement being of the type which is secured to a housing of a commutator motor at a longitudinally axial opening therein, the longitudinally axial opening being arranged near a commutator of the commutator motor, the arrangement being provided with a front plate arranged substantially transverse to the longitudinally axial direction of the motor, the front plate being arranged at one end of a brush support plate and having mounting bars projecting axially parallel with the commutator of the commutator motor and disposed so as to be within the housing of the commutator motor when the arrangement is installed thereon, the arrangement being further provided with a plurality of hammer-shaped brush holders having open bearing shells which are rotatably engaged with, so as to depend from, respective ones of the mounting bars, the hammer-shaped brush holders being secured against axial displacement in one direction by being in contact with the front plate of the brush support plate, and rotatably displaceable about the mounting bars, the arrangement further comprising an end plate affixed to the brush support plate at the mounting bars, whereby predetermined portions of the hammer-shaped brush holders are arranged axially intermediate of the front and end plates, said end plate being provided with at least one guide portion for engaging said predetermined portion of a respective one of the hammer-shaped brush holders, said end plate securing the hammer-shaped brush holders from being displaced in a second axial direction.

2. The arrangement of claim 1 wherein said end plate is provided with two guide portions which are configured as ribs which protrude axially from said end plate.

3. The arrangement of claim 2 wherein there are further provided front plate guide portions in the form of partially circular depressions which are disposed axially into the front plate near the mounting bars.

4. The arrangement of claim 3 wherein said ribs are formed integrally with the front plate, and said partially circular depressions are formed into said end plate.

5. The arrangement of claim 3 wherein said end plate is provided with elastic openings for engaging the front plate in a self-locking manner.

6. The arrangement of claim 5 wherein there are further provided posts which are axially formed on the mounting bars for engaging said elastic openings of said end plate.

7. The arrangement of claim 1, 2, 3, 4, 5, or 6, wherein the brush support plate is provided with guide edge slots for engaging at least one edge of the longitudinally axial opening of the housing of the commutator motor, and the mounting bars being provided with edge supports for rotatably engaging the hammer-shaped brush holders.

8. The arrangement of claim 6 wherein the front plate, said front plate guide portions, and the mounting bars with said posts thereon, are integrally formed.

* * * * *